US008966362B2

(12) United States Patent
Smetters et al.

(10) Patent No.: US 8,966,362 B2
(45) Date of Patent: Feb. 24, 2015

(54) METHOD AND SYSTEM FOR IN-DOCUMENT MARKUP IN SUPPORT OF INFORMATION SHARING

(75) Inventors: Diana K. Smetters, Belmont, CA (US); Elizabeth F. Churchill, San Francisco, CA (US); Lester D. Nelson, Santa Clara, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 2094 days.

(21) Appl. No.: 11/803,920

(22) Filed: May 15, 2007

(65) Prior Publication Data

US 2008/0288862 A1    Nov. 20, 2008

(51) Int. Cl.
 G06F 17/00    (2006.01)
 G06F 17/21    (2006.01)
 G06F 17/24    (2006.01)

(52) U.S. Cl.
 CPC ............ G06F 17/218 (2013.01); *G06F 17/241* (2013.01)
 USPC ........................................................ 715/255

(58) Field of Classification Search
 CPC .............................. G06F 17/218; G06F 17/241
 USPC .................................................... 715/255
 See application file for complete search history.

(56) References Cited

U.S. PATENT DOCUMENTS

| | | | |
|---|---|---|---|
| 5,890,177 A * | 3/1999 | Moody et al. ................. | 715/210 |
| 6,240,429 B1 | 5/2001 | Thornton et al. ............. | 707/500 |
| 6,253,217 B1 | 6/2001 | Dourish et al. ............... | 707/500 |
| 6,266,670 B1 | 7/2001 | LaMarca et al. ............. | 707/100 |
| 6,266,682 B1 | 7/2001 | LaMarca et al. ............. | 707/501 |
| 6,266,683 B1 * | 7/2001 | Yehuda et al. ................ | 715/234 |
| 6,269,380 B1 | 7/2001 | Terry et al. ................... | 707/200 |
| 6,308,179 B1 | 10/2001 | Petersen et al. ............... | 707/102 |
| 6,324,551 B1 | 11/2001 | Lamping et al. .............. | 707/500 |
| 6,330,573 B1 | 12/2001 | Salisbury et al. ............. | 707/511 |
| 6,370,533 B1 | 4/2002 | Sato et al. ..................... | 707/514 |
| 6,370,538 B1 | 4/2002 | Lamping et al. .............. | 707/102 |
| 6,397,231 B1 | 5/2002 | Salisbury et al. ............. | 707/515 |
| 6,430,575 B1 | 8/2002 | Dourish et al. ............... | 707/200 |
| 6,535,884 B1 | 3/2003 | Thornton et al. ............. | 707/100 |
| 6,537,830 B1 * | 3/2003 | Arita et al. ....................... | 438/3 |
| 6,551,351 B2 * | 4/2003 | Smith et al. .................. | 623/1.16 |
| 6,562,076 B2 | 5/2003 | Edwards et al. .............. | 715/515 |
| 6,647,391 B1 | 11/2003 | Smith et al. ................... | 707/100 |
| 7,111,234 B2 * | 9/2006 | Peck et al. ..................... | 715/255 |
| 2003/0237051 A1 | 12/2003 | LaMarca et al. .............. | 715/513 |
| 2005/0033813 A1 * | 2/2005 | Bhogal et al. ................. | 709/206 |
| 2005/0188322 A1 * | 8/2005 | Napoleon ..................... | 715/760 |
| 2007/0258100 A1 * | 11/2007 | Kano ............................. | 358/1.5 |

OTHER PUBLICATIONS

Phelps et al., "The Multivalent Browser: A Platform for New Ideas", DocEng'OI, Nov. 9-10, 2001, Atlanta, Georgia, p. 58-67.*

(Continued)

*Primary Examiner* — Amelia Tapp

(74) *Attorney, Agent, or Firm* — Shun Yao; Park, Vaughan, Fleming & Dowler LLP

(57) ABSTRACT

A system is provided to facilitate content dissemination. During operation, the system allows a user to add a tag to a first document, wherein the tag indicates an operation to be performed on a portion of the document. The system then processes the tag and performs the operation on the document portion based on the tag.

23 Claims, 6 Drawing Sheets

(56) References Cited

OTHER PUBLICATIONS

S. Chong and R. Pucella, "A Framework for Creating Natural Language User Interfaces for Action-Based Applications", presented at CoRR, 2004, p. 1-15.*

T.A. Phelps and R. Wilensky, 2001. The multivalent browser: A platform for new ideas. Proceedings of the 2001 ACM Symposium on Document Engineering, E. V. Munson, Ed. ACM Press, New York, 58-67.*

Documentation for Snippetmaster software, 2006, retrieved from Internet Archive Wayback Machine at http://web.archive.org/web/20060414205032/http://www.snippetmaster.com/documentation/ pp. 1-10.*

* cited by examiner

METHOD AND SYSTEM FOR IN-DOCUMENT MARKUP IN SUPPORT OF INFORMATION SHARING

BACKGROUND

1. Field of the Invention

Embodiments of the present invention relate to document management. More specifically, embodiments of the present invention relate to a method and system for content dissemination by in-document tagging.

2. Related Art

Network-based document dissemination is an increasingly critical part of everyday work. However, current dissemination mechanisms, such as email, networked file systems, document management systems, or workflow systems suffer from several limitations.

In conventional systems, users can only send information at the level of entire documents. To share selected portions of documents, a user is typically required to manually extract the specific content to be shared, e.g. using cut and paste, and sending it to the recipient as a separate document or in an email message. This manual process not only is cumbersome, but also makes it difficult to reestablish context for the information or to incorporate responses into the original content when the recipient replies with comments or changes to the shared content.

In addition, conventional document sharing typically requires special sharing-related interfaces or applications, which are often stand-alone modules and are outside the context in which the information to be shared is actually generated (e.g., a word processor where the document is edited). In addition, most of these interfaces or applications only allow simple distribution of information, whereas specialized functions, such as requests for comments, edits, or approval, are often performed in an ad-hoc fashion using, for example, context provided in an email message.

SUMMARY

One embodiment of the present invention provides a system that facilitates content dissemination. During operation, the system allows a user to add a tag to a first document, wherein the tag indicates an operation to be performed on a portion of the document. The system then processes the tag and performs the operation on the document portion based on the tag.

In a variation on this embodiment, the tag specifies one or more of: an action, the portion of the document, and a receiving entity corresponding to the action.

In a further variation, the action comprises one or more of: a showing of, sharing of, copying of, request of comment for, and a request of approval for the document portion with respect to the receiving entity. The document portion may include a paragraph, a section, and/or a specific text location. The receiving entity can be identified by at least one of: one or more user identifiers, one or more group identifiers, one or more email addresses, one or more network addresses, and one or more pathnames.

In a variation on this embodiment, allowing the user to add the tag involves allowing the user to insert the tag inline within the document.

In a further variation, allowing the user to insert the tag in the document involves providing the user with a visual representation of a collection of tags and allowing the user to select one or more tags from the collection of tags.

In a variation on this embodiment, the operation includes sending the content portion to a second user. The system further receives a second document or document portion in response to the operation performed and modifies the first document based on the second document or document portion.

In a variation on this embodiment, the system receives a user command which triggers the processing of the tag.

In a variation on this embodiment, the processing of the tag is performed at pre-determined times.

In a variation on this embodiment, the system triggers the processing of the tag based on one or more events.

In a variation on this embodiment, performing the operation on the document portion involves encrypting a copy of the document portion and sending the encrypted copy to the receiving entity.

In a variation on this embodiment, performing the operation on the document portion involves authenticating a copy of the document portion by signing the copy with a digital signature and sending the authenticated copy to the receiving entity.

In a variation of this embodiment, at least a part of the tag is formulated in natural language or contains an abstract specification which can be used to identify at least one portion of the first document.

Figure 1:
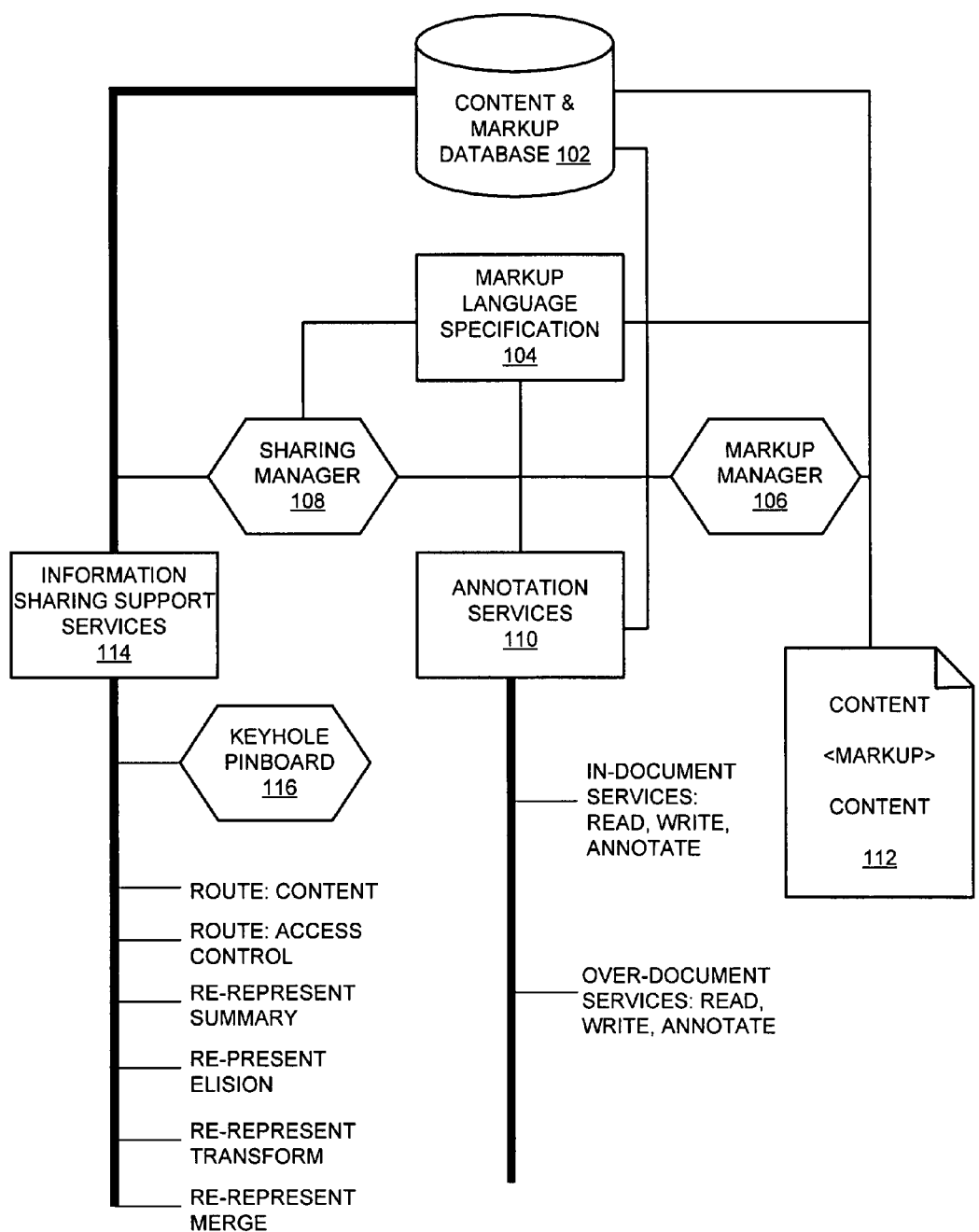
FIG. 1 illustrates an exemplary architecture that facilitates in-document tagging for content dissemination in accordance with one embodiment of the present invention.

TABLE 1 presents a section of exemplary Visual Basic code for tag processing in accordance with one embodiment of the present invention.

DETAILED DESCRIPTION

The following description is presented to enable any person skilled in the art to make and use the invention, and is provided in the context of a parti-cular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a system that enables users to disseminate portions of documents. Such a portion can be disseminated either in isolation, or with the remainder of the original document which is provided as context whereas the disseminated portion can be made immediately and directly accessible. This content sharing/dissemination system provides a number of desirable features.

First, many documents are often large, and both the originating and receiving users may be interested in only part of a document. The present inventive content-dissemination system can reduce the amount of information the recipient needs to consider. Further more, by using the present content-dissemination system, the originating user can increase both the likelihood that the recipient will be able to respond in a timely fashion, and the likelihood that the response will be more focused on the issues of concern.

Second, a recipient of shared content may be only authorized to have access to some, but not all of the entire document. Currently, the only means to accomplish partial content dissemination is manual extraction of the content from the containing document, as described above. Embodiments of the present invention facilitate dissemination of only a portion of a sensitive document without manual extraction.

Embodiments of the present invention also enable users to share content in the context of their ongoing workflow. For example, a user can mark a certain paragraph as "shared with Jean" while editing that paragraph, without having to remember to send the document or a portion thereof separately later. Such in-document tag-based dissemination reduces cognitive load on the sender, and therefore can reduce mistakes, such as a user forgetting to send the information. This system also lowers the barrier to and overhead of information exchange, so that users can take greater advantage of the resources made available by information sharing.

Furthermore, embodiments of the present invention provide not only a one-way information-dissemination system, but also a mechanism to request and receive content, thereby "closing the loop" for the context of a user's work flow. For example, a user can indicate directly in the file she is working on that another user Jean should be sent a request for comments on a given paragraph. The system can then automatically present the returned comments in the context of that paragraph. Such presentation allows the user to be immediately aware of both the provided response and the context of the information being discussed, without manually searching for or merging multiple inputs into a single document.

In this disclosure, certain terminologies are given the following definitions:

The term "content" refers to a collection of information which can be based on any format. For example, a piece of content can include text, audio data, visual data, or a mixture thereof.

The term "document" refers to a piece of content. For example, a document can be a text file, an audio file, an email, a piece of programming code, a video clip, or a multi-media file. Generally, embodiments of the present invention can operate on a document or a portion of a document. Such a document portion can be any subset of a document, including, but not limited to, one or more sentences, paragraphs, sections, graphs, audio or video clips, or an arbitrary combination of text and/or other forms of media. A document portion can also include discontinuous pieces of a document. Furthermore, a piece of content can refer to a document or a portion of a document.

The term "disseminate" or "dissemination" refers to the operation of sending a document or a portion thereof to a receiving entity. Such operation not only includes allowing the receiving entity to view or access the content, but can also include requesting and receiving responses, such as approval, comments, feedback, or a piece of modified content. In this disclosure, "sharing" means allowing a receiving entity to view and change the content, and the modified content can be incorporated into the original content. "Showing" means allowing a receiving entity to view the disseminated content but the system does not perform incorporation-back.

The term "tag" refers to a piece of descriptive text which can be inserted in a document, often inline with the document. A tag can specify an operation to be performed on a portion of the document. In this disclosure, a tag is also referred to as "markup" or "meta-data," both of which can be used to describe the content. A tag can be delineated from other text by special symbols, such as "<," ">," or "|." "Tagging" refers to the operation of inserting one or more tags into a document.

The term "receiving entity" refers to not only one or more users, but also a non-human recipient, such as a data storage mechanism, a computer system, or a software application. In general, a receiving entity can include one or more recipients. A receiving entity can be identified by a user identifier, an email address, a network address, a pathname, or a combination thereof.

In-Document Tagging for Content Dissemination

Typically, tagging involves manual addition of meta-data to a piece of content. One embodiment of the present invention provides a system that facilitates in-document tagging for disseminating of a portion of a document. This technique is referred to as "keyhole tagging," because by looking through a "keyhole" one can have a restricted view of the document.

In one embodiment, a user can add text tags within a document that is being read or is under creation. Tags can be grammatical elements that indicate how content is to be stored and/or directed and thus effectively shared. Parsing the tags according to a set of pre-specified rules is important to a service for pointing people to resources. Therefore, keyhole tagging can facilitate social resource management, and is an easy-to-use form of scoped syndication of socially relevant media.

In general, a tag specifies an action, a portion of the document upon which the action is to be performed, and a receiving entity corresponding to the action. The action specified by a tag can be any information dissemination operation, such as showing, sharing, or copying. Such operation can also be a request for comments or approval.

The document portion specified by a tag can be a paragraph, a section, a chapter, or specific text locations indicated by page number, column number, and/or line number.

The exemplary scenarios below illustrate the concept.

Keyhole Tagging Scenario

Sitting the café, user Jeffrey is drafting the content for his latest article. This article is in reaction to a conversation earlier in the day about the recent Survival Research Labs show that he and some friends saw in San Jose. As he constructs his argument regarding the technical, social, and cultural issues in the show, he realizes user Jane may be interested in the comments he is making on the technical aspects of the tele-robotics in the show. As this comes to mind, he types the following keyhole tags into the text: <<Show><paragraph><to Jane>>. He continues typing. Some time later, on inserting an image and a short video clip he took of the event, he decides that these would illustrate some of the text he has noted to show Jane, and also that Dick would likely be interested. At this point he types the keyhole tags <<Show><video, image><to Dick, Jane>>.

On saving the document, Jeffrey's computer processes these tags and sends emails to Dick and Jane. Both Dick and Jane are informed by email that Jeffery has some content to show them. The email message to Jane includes three links (for the text, video and picture), and the message to Dick includes two links (for the video and picture). Clicking on the links takes Jane and Dick to the respective content Jeffrey has indicated. In one embodiment, these content pieces are shown as elements in Jeffrey's Keyhole Pinboard, a web-based repository with access control to elements as granted by the tags he has placed in the text. This pinboard is effectively an aggregation or collage of media elements, each with access restrictions that determine what readers can see.

As Jeffrey continues, it becomes apparent that the final conclusion needs work. Thinking that user Belinda may be able to help him with this problem, he types <<Share><document><with Belinda>> in the document. On finishing up for the evening, he saves the file. A dialogue box opens indicating that Belinda is not a known recipient, and the Keyhole Tagging Management Interface opens to allow Jeffrey to add Belinda and her contact information to his list of contacts. He saves this information, and the notification is sent to Belinda, who receives a link which downloads the file. By stating "share" instead of "show" Jeffrey has indicated a greater level of access control to the document—that is, both read and write privileges instead of only read privileges that Dick and Jane have been granted in the sharing of the paragraph, and the video and text.

In one embodiment Jeffrey can see the formats he has shared with Dick and Jane by selecting the links that are recorded in a sharing manager. He can also insert tags that allow him to use elements of the document to create new configurations as web pages or other documents. For example, when he types <<Show><paragraph 1, video, caption, paragraph 8><to Web>>, he has indicated that the new document for view should include paragraph 1, the video, the nearest caption, and paragraph 8. This tool therefore allows artful creation of new views and new content from preexisting elements. The syntax <<action><content><destination>> is thus very powerful.

In general, keyhole tagging can facilitate:
a. different views of content;
b. keyhole tagging mashup, which allows an application to aggregate or integrate multiple pieces of content shared by keyhole tagging;
c. in document mark-up;
d. exchange of standaside content;
e. related work, which for video data can include scene-graphs, and Web annotation;
f. tagging/data routing through attribution;
g. interaction methods for viewing tags; and
i. sharing active tags.

A second exemplary scenario involves a National Institute of Health (NIH) grants peer-review-meeting situation based on shared virtual workspace, which is described at http://enterprisearchitecture.nih.gov/ArchLib/AT/TA/sharedvirtualworkspceusage scenarios.htm.

In this scenario, a central office and a number of satellite offices conduct meetings of peer scientists to synthesize expert opinion on a set of grant applications in order to establish priority of approval recommendations for extramural research grants. These meetings typically have high security and sensitivity concerns in order to protect the integrity and openness of the discussions while avoiding any ethical conflicts that might arise if a reviewer has a personal or financial connection with another applicant. Historically, NIH has incurred substantial costs to bring these reviewers to a common location to review large paper applications. It is more effective and efficient to conduct these meetings virtually. A virtual workplace allows NIH to recruit reviewers who are willing to participate in the process but cannot, for personal or business reasons, afford to spend the time traveling to a single location. This virtual workplace also helps NIH avoid travel costs and the time needed to arrange and reimburse such travel.

Assume that a user, Dr. Sage, has been asked to lead an effort to quickly qualify which set of proposals should be considered next for full review from the pool of submitted documents. He opens the first proposal document and, based on personal experience in his field, quickly assigns reviewers for the technical and cost parts of the proposal, respectively:

SHARE SECTION WITH drspock@brainfarm.edu, and
SHARE SECTION WITHfortune500@costmagic.com.

This assignment allows each expert to view and comment on their assigned section. In one embodiment, the system allows one recipient to see the response returned by other recipients in reaction to the tags. In other words, the system functions as a hub and relays the responses from different recipients.

Note that Dr. Sage can send to a recipient only an isolated document portion which is intended to be shared. Dr. Sage can also send the document portion with additional context from the document while making the portion intended for sharing distinguishable from the context and easily navigable. This way, the recipient can expand his view of the document portion to read the surrounding context. This type of sharing with context can facilitate the recipient's understanding of the content, especially if the sender just wants to draw attention to the intended portion but does not want to limit access to the document, or if the sender misjudges how much context is necessary for the intended document portion. In addition, Dr. Sage can still assign a negative access control to certain document portions, which prevents the recipient from accessing the protected portions. For example, Dr. Sage can add a tag RESTRICT PARAGRAPH from conflict@blah.com.

This way, even if a recipient (represented by conflict@blah.com in this case) can view the rest of the document as context, he still cannot access the sensitive portions protected by the tag above.

Assume that, for a separate multi-team proposal, the assignment is more difficult, because the best qualified expert has a potential conflict of interest on one part of the overall plan, but not on one point of fact where his expertise is most relevant. Dr. Sage resolves this issue by tagging the sensitive paragraph in question, which in this example is a table of results, with the tag SHOW PARAGRAPH TO oblio@pointoffact.edu.

Note that, in general, the system can have different levels of disclosure of the context. For example, the system can implement the following context-disclosure levels:

(a) Show only the tagged content.

(b) Show the tagged content with a representation of the context. (e.g., encrypted, obscured, redacted, visually minimized for easy reading, etc.).

(c) Show (b) above only if requested and if the recipient is allowed to access the requested context.

(d) Show the tagged content with a portion of the original context (the actual document or a copy of the document).

(e) Show (d) above only if requested and if the recipient is allowed to access the requested context.

(f) Show the tagged content with the entire original context (the actual document or a copy of the document).

(g) Show (f) above only if requested and if the recipient is allowed to access the requested context.

A third exemplary scenario where keyhole tagging can be used is a subcontractor proposal situation, which is based on a project described in http://arjuna.ncl.ac.uk/projects/workflow_system/98-03-09.pdf. This situation is based on a workflow reference model used for Workflow Management and has been modified to accentuate cross-organizational boundaries. The original business situation is the design of airplane parts.

In this scenario, it is assumed that two groups work together. One group includes design engineers in charge of airplane design. The other group is responsible for standard parts and includes standard part engineers (or standard engineers for short). Design engineers contact the standard parts group to select standard parts, to ask for modification of parts or to ask for the design of new standard parts. When a design engineer is in need of a standard part, he discovers that as part of his work. If a design engineer is not able to find a standard part, he most likely asks for the modification of an existing part according to his needs or he asks for a completely new part.

Assume that a design engineer, Desi, who works for WeMakeBigSystems, Inc., needs to write up a memorandum documenting a subassembly implementation strategy as part of a larger design proposal. She opens her office application with a memo template and starts entering the part information, cutting and pasting from design notes as needed. As she writes, she realizes that a part from Part Co.biz might be good, but requires more information. She enters the following keyhole tag in the Memo, SHOW PARAGRAPH TO servicerep.Pat@partco.com.

This action results in the specified request being made, and provides a marker back into her memo when the reply comes back. Desi realizes that the standard part might need to be modified, and alternative parts considered, so she tags the memo with SHARE PARAGRAPH WITH standards@wemakebigsystems.com.

In this way, the standard parts group can see the design memo draft and the part indicated to decide what modification might be appropriate, if any. This action results in the document being shared with paragraph highlighted, and provides a marker back into the memo when the reply comes back. Note that the system can also facilitate multi-party tagging. That is, one recipient can observe the reaction of other recipients to their tags. In this example, a member of the standard parts group can see what a member of the design group says about a standard part and can then change the standard description accordingly.

Implementations

FIG. 1 illustrates an exemplary architecture that facilitates in-document tagging for content dissemination in accordance with one embodiment of the present invention. In one embodiment, the system includes a content and markup database 102. A piece of content 112 that includes tags (markup) can be stored in content and markup database 102.

The tags inserted in content 112 are constructed in accordance with a set of markup language specification 104. A markup manager 106 processes the tags in content 112 and passes the dissemination operations to a sharing manager 108. Note that the processing of tags can be triggered by an explicit or implicit user command. For example, tag processing can be triggered by a "process tag" command issued by the user, or by a "document save" command or an "exit" command. In further embodiments, the processing of tags can be performed at pre-determined times, such as at regular intervals. Tag processing can also be triggered by certain system events, such as when the system clock reaches a certain time, or when the user performs certain operations.

Sharing manager 108 is responsible for determining how the content is to be communicated to a receiving entity. Note that a number of communication services can be used to deliver the content. Such services can include email, instant messaging, wireless services, phone-based services, and fax-based services. In one embodiment, sharing manager 108 can encrypt the content piece to be disseminated to increase the security level of document sharing. In addition, sharing manager 108 can also authenticate a copy of the content piece by, for example, signing the copy with a trusted digital signature.

Sharing manager 108 subsequently selects from a set of information sharing support services 114 and performs the sharing operation. Information sharing support services 114 can include a number of services, such as a Keyhole Pinboard 116. As described above, Keyhole Pinboard 116 can be a repository with access control to content pieces as specified by the tags. Note that information sharing support services 114 can provide a number of services, such as content routing, content access control, and re-representing the content with a summary, elision, transformation, or a merge.

Tagging can also be used to implement other functions, such as annotation services 110. Annotation services 110 can include in-document services and over-document services.

In one embodiment, the keyhole tagging system is implemented in conjunction with MICROSOFT WORD™. Content and markup can be stored inline in MICROSOFT WORD files. Distribution of markup data and links to content can be stored in a MySQL database table.

One form of meta-data expression is based on keyword tags. These keyword tags are processed according to rules run in tandem or together with the content editing process. For example, if a user tags a paragraph with "|SHOW BOB|" or "|COPY bob@bobscompany.net|," the content of that paragraph is transmitted to Bob by using any possible addressing scheme, such as name lookup or direct addressing.

In a further embodiment, a user can form more complicated expressions by "tagging the tags" to qualify the sharing intent. For example, if a user tags a paragraph with |SHOW-BOB COPY-TED, CAROL, ALICE|, then two specifically addressed actions are indicated. Namely, the SHOW tag has been modified with the BOB tag indicating a single destination for the SHOW action, and this is distinct from the COPY tag which has multiple addresses.

Another form of tagging involves formatting markup, such as an explicitly declared syntax following, for example, the Backus-Naur form:

1. <markup>::="|"<action><content><destination>"|"
2. <action>::=SHOW|SHARE|CLIP|COPY
3. <content>::=SENTENCE|PARAGRAPH|SECTION|DOCUMENT
4. <destination>::=TO<person>
5. <person>::=DICK|JANE|JEFFERY|BELINDA
6. <group>::=HUMAN RESOURCES|TECH SUPPORT|MANAGEMENT Note that a group can be identified by a group name instead of an explicit list of people, and the group membership can be maintained outside the document. Similarly, a person can be identified by his/her role, such as "general manager." The identity associated with different roles can also be managed outside the document.

In one embodiment, a tag can be formulated in natural language instead of in syntactical specifications. For example, tags can contain abstract descriptions of content which form a content group, rather than syntactical specification of content or content locations. In general, any abstract specification can be used to describe the content to which the tag applies. Particularly, a single specification can be used to dynamically identify multiple, potentially disconnected portions of the document. For example, a user can specify "DENY BOB ALL PARAGRAPHS REFERRING TO PAYROLL," and a natural language-based post-processing system can be used to automatically identify all the paragraphs meeting the condition "REFERRING TO PAYROLL" and apply the tag operation "DENY BOB" to these paragraphs. Note that any natural language processing technologies can be used to parse such tags formulated in natural language.

Figure 2:
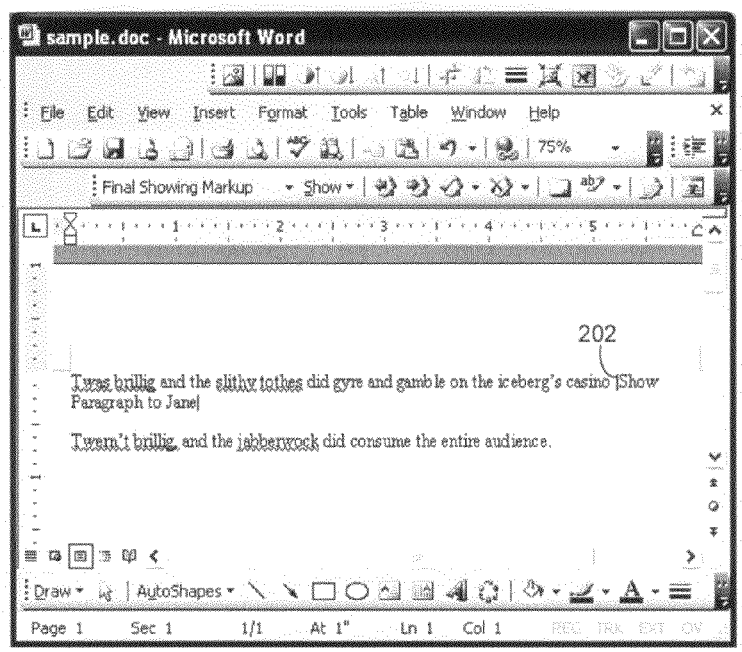
FIG. 2 illustrates an exemplary in-document tag in accordance with one embodiment of the present invention.

FIG. 2 illustrates an exemplary in-document tag in accordance with one embodiment of the present invention. A tag 202, "|Show Paragraph to Jane|," is inserted at the end of a paragraph in a WORD document. Note that tag 202 is delineated by a special symbol "|."

In one embodiment, the annotation services are provided by a MICROSOFT WORD macro implemented in Visual Basic for applications executed upon user request when a file is saved or upon any designated events. The following operations are performed for tag processing, where "match" designates any parsing match function, such as the operation of a tokenizer.
1. Search for tag text (e.g., in regular expression form |SHOW?*|)
2. If a tag string matches ("PARAGRAPH"), expand search selection to the paragraph where the tag is located (e.g., in Visual Basic for Applications, Selection. Expand may be used).
3. If a tag string matches ("DOCUMENT"), create a link to the document content (e.g., generalized filename, Universal Resource Locator, identifier in a document management system).
4. Query if markup is already in the database.
5. If not, write the content and meta-data into the content and markup database (e.g., connect to a mySQL database and issue an Insert instruction). Tag content may be stored in any repository, including hidden fields of a document, local and remote files, or local or remote databases.

TABLE 1 presents a section of exemplary Visual Basic code for tag processing in accordance with one embodiment of the present invention.

Figure 3:
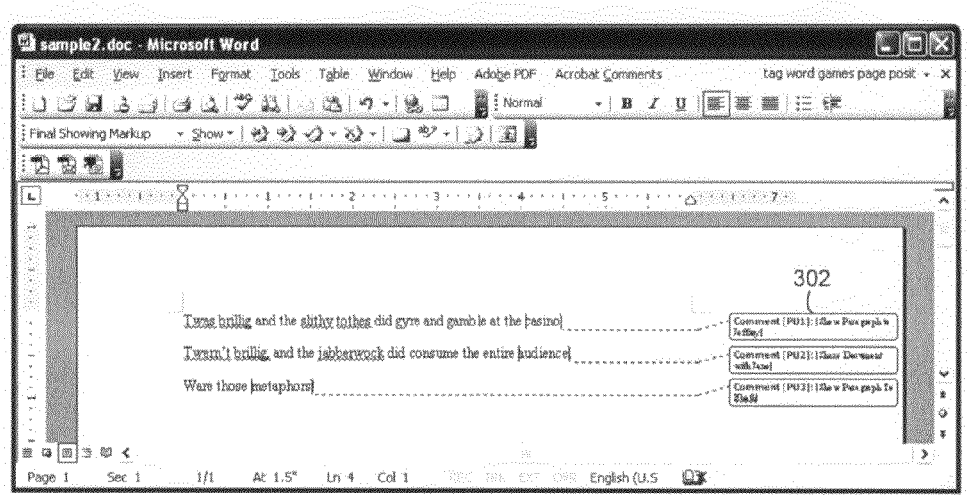
FIG. 3 illustrates exemplary tags specified in WORD comment structures in accordance with one embodiment of the present invention.

Note that tags may be written inline with content as entities associated with the content, such as comments or other embedded control structures. FIG. 3 illustrates exemplary tags specified in WORD comment structures in accordance with one embodiment of the present invention. In this example, tags, such as tag 302, are inserted in the document as comments. Note that although in WORD comments are generally directed to a single word, the tags can still specify an arbitrary portion of the document, such as a paragraph, a section, or a collection of discontinuous segments of the document.

Figure 4:
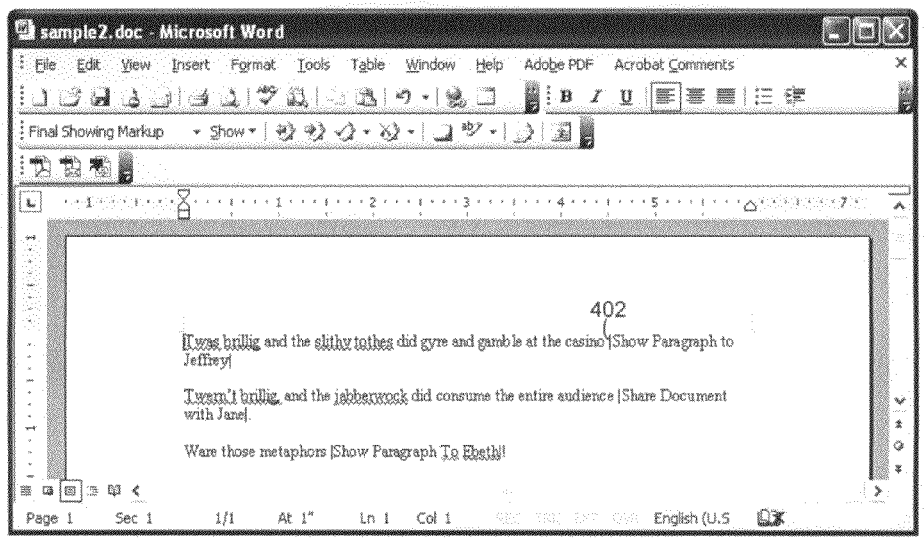
FIG. 4 illustrates exemplary tags specified inline with WORD content in accordance with an embodiment of the present invention.
Figure 5:
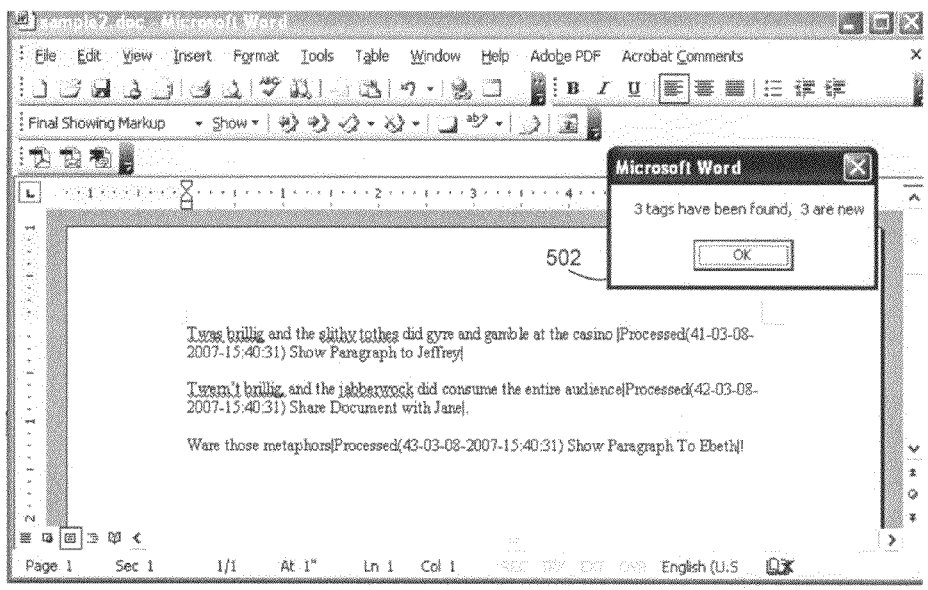
FIG. 5 illustrates exemplary tags with transaction IDs in accordance with an embodiment of the present invention.

FIG. 4 illustrates exemplary tags specified inline with WORD content in accordance with an embodiment of the present invention. Here similar tags as those in FIG. 3 are inserted as in-line text tags. Tag 402, which has similar syntax as tag 302, is inserted after the second paragraph with "|" symbols as delineators.

TABLE 1

```
Sub DoTag( )
    On Error GoTo DoTagErrorHandler
    Selection.Find.ClearFormatting
    With Selection.Find
        .Text = "|Show?*|"
        .Replacement.Text = " "
        .Forward = True
        .Wrap = wdFindContinue
        .Format = False
        .MatchCase = False
        .MatchWholeWord = False
        .MatchByte = False
        .MatchAllWordForms = False
        .MatchSoundsLike = False
        .MatchFuzzy = False
        .MatchWildcards = True
    End With
    Selection.Find.Execute
    If Len(Selection.Text) > 1 Then
        With Selection
            .Collapse
            .Expand Unit:=wdParagraph
        End With
        Selection.Copy
        If Not URLIsValid("http://localhost/phptests/mydb.php?value="_ +
                Selection.Range) Then
            MsgBox ("URL is bogus")
        End If
    End If
DoTagErrorHandler:
    Exit Sub
End Sub
Function URLIsValid(URL As String) As Boolean
'Requires Microsoft WinHTTP Services (winhttp.dll) to be registered
'on the host system.
    On Error GoTo URLIsValid_Error
    Dim objHTTPRequest As Object
    Set objHTTPRequest = CreateObject("WinHttp.WinHttpRequest.5.1")
    With objHTTPRequest
        .Open 1, URL ' WinHttpRequestOption_URL = 1
        .Send
    End With
Clean_Up:
    Set objHTTPRequest = Nothing
    URLIsValid = True
    Exit Function
URLIsValid_Error:
    URLIsValid = False
    Resume Clean_Up
End Function
```

After keyhole tags are processed, they are marked as processed and assigned a transaction identifier. This identifier prevents inadvertent reprocessing and also allows subsequent processing to be merged or tracked back to the original content and any external storage of content and/or meta-data (e.g., in a database). Subsequent processing may include replies sent back to the original document from any addressed destination and incorporation of additional information either into the original content or data attached to the original content (such as comments), or supplemental recording of the additions into any external storage of content and/or meta-data (e.g., in a database).

Figure 6:
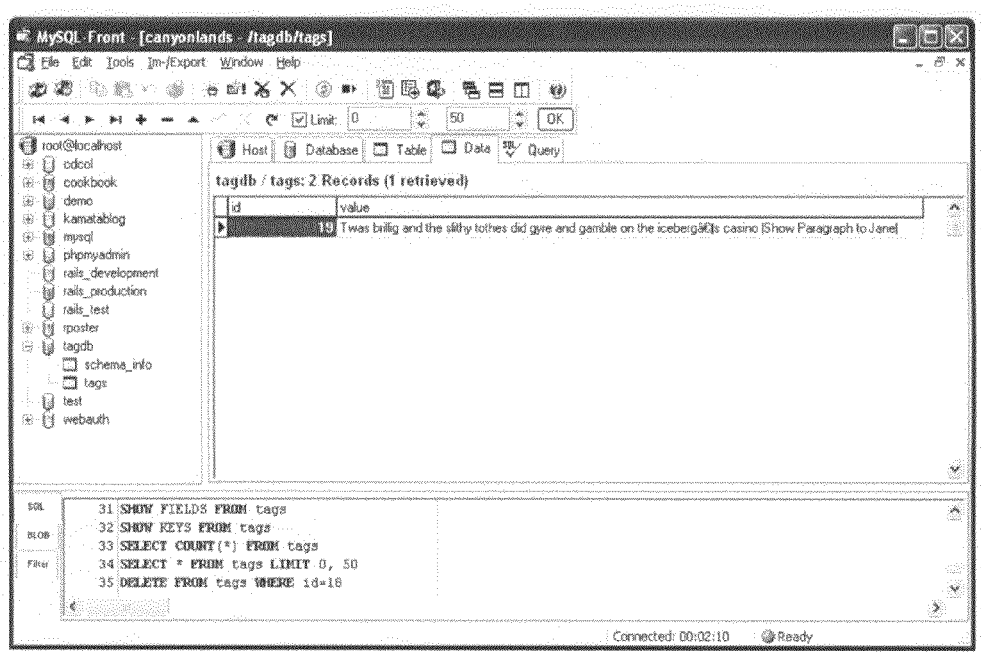
FIG. 6 illustrates an example where tags are managed at the data-repository level in accordance with one embodiment of the present invention.

In one embodiment, markup manager 106 can be a general database interface, such as mySQLFront, or a customized collection of general purpose access methods, implemented in for example PHP scripts. FIG. 6 illustrates an example where tags are managed at the data-repository level in accordance with one embodiment of the present invention. Here the tags are managed at a MySQL database which serves as a data repository for tags and the corresponding content. The Markup Manger in this case is the MySQL database interface.

Figure 7:
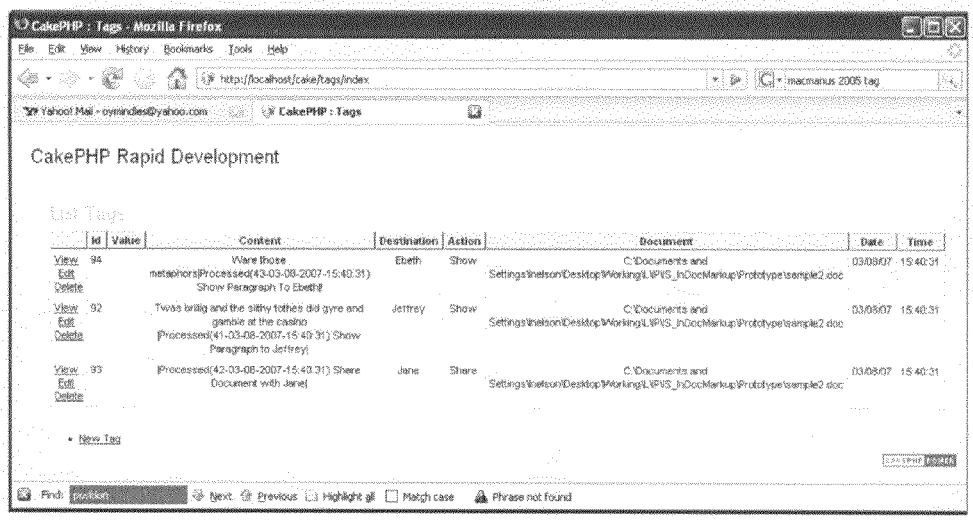
FIG. 7 illustrates an example where tags are managed through customized interactions which support specific information sharing needs in accordance with one embodiment of the present invention.

Similarly, an information sharing service such as the Keyhole Pinboard or Sharing Manager may be implemented as a customized collection of access methods implemented in for example PHP scripts. FIG. 7 illustrates an example where tags are managed through customized interactions which support specific information sharing needs in accordance with one embodiment of the present invention. Here the Markup Manager is implemented using PHP scripts and is accessible as a Web page.

Within this framework the system may implement a number of refinements and extensions under different circumstances. For example, the system may implement exception-handling procedures to generate feedback for incomplete, incorrect, or underspecified markups. The system can also provide a user a visual representation, such as a drop-down menu, of ready-to-use tags. That is, the system can provide a click-and-select type of user interface to facilitate tag insertion. Furthermore, the system can extend its library of tags by allowing a user to add to and/or edit existing tags. Note that the system can employ a variety of visual representation of tags, such as graphical palette of common tags, or association between a tag and a color. For example, when applying a functional tag to a set of disconnected blocks of text, a user can select or highlight the intended portions in one color. The user can then right click on the highlighted portions and add a tag to the highlighted portions. In a further embodiment, the system an provide a user interface that adds one or more tags to a document or document portion by allowing a user to add that document or document portion to an existing group of content over which one or more tags are configured to operate.

The system can also be configured to handle new or changed actions, objects, and sharing destinations. In one embodiment, the markup system extendible though user commands or through and administrative interface. The system can further implement version control and assign metadata on the markup. For example, the system can assign and propagate timestamps and ID's to tags.

In further embodiments, the system can provide alternative representations and views and storage of markup. For example, the system can automatically convert processed markup into alternative forms and/or structures such as XML and/or MICROSOFT WORD Comments.

Figure 8:
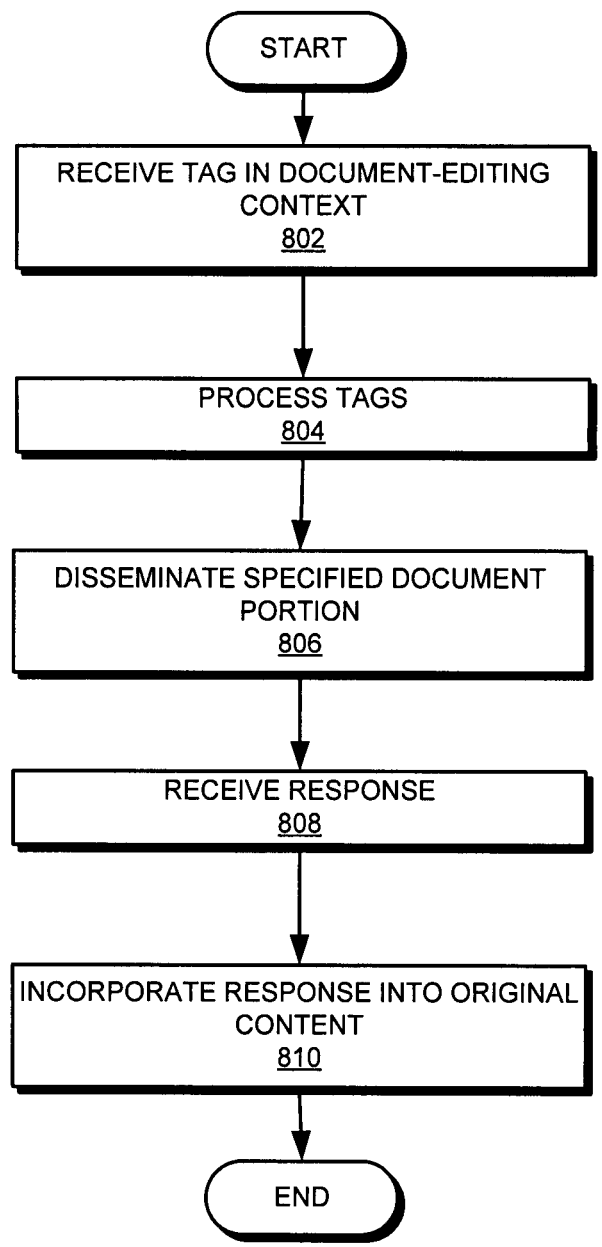
FIG. 8 presents a flowchart illustrating an exemplary process of tag processing for content-dissemination in accordance with one embodiment of the present invention.

FIG. 8 presents a flowchart which illustrating an exemplary process of tag processing for content-dissemination in accordance with one embodiment of the present invention. During operation, the system receives tags for document sharing in a document-editing context, such as within a word processor (operation 802). The system them processes the tags (operation 804). The system further disseminate document portion specified in a tag to a recipient (operation 806). Optionally, the system receives a response (operation 808). The system then incorporates the response into the original content (operation 810).

Figure 9:
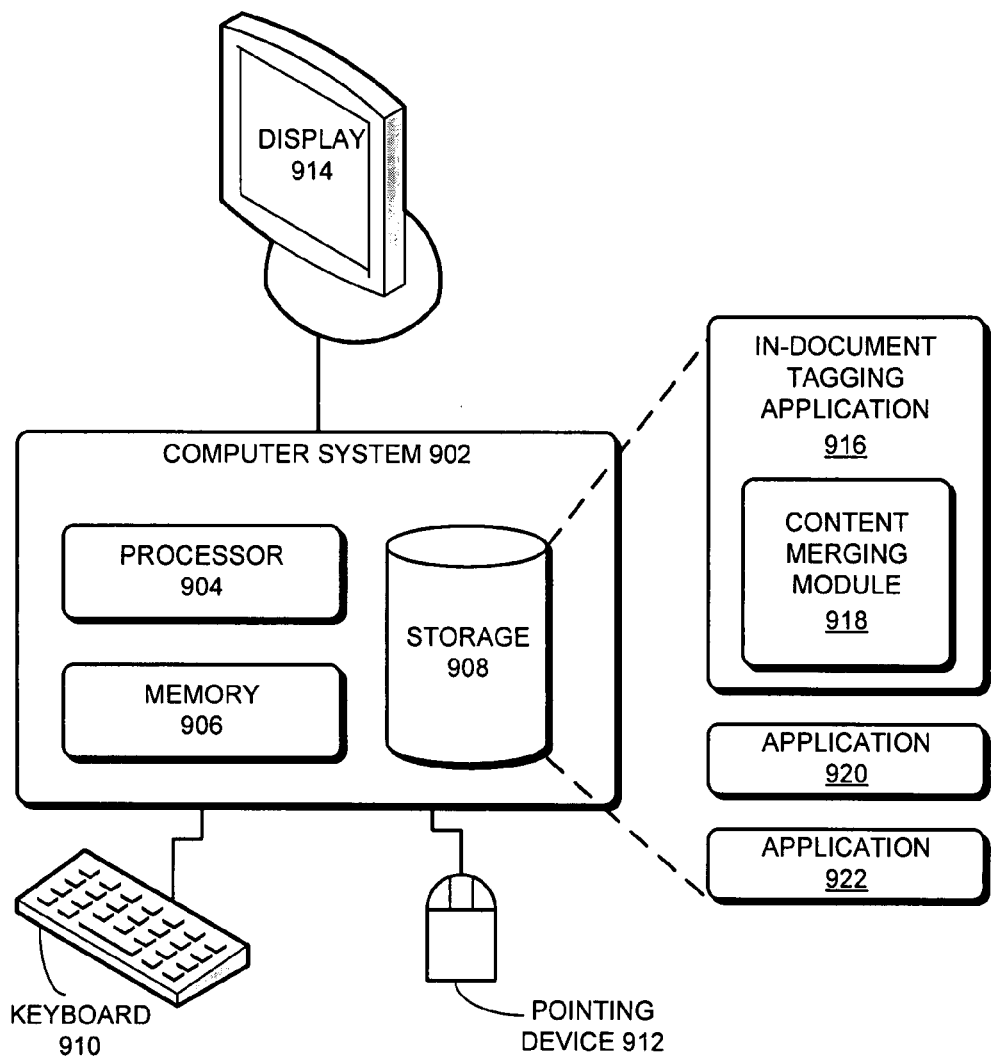
FIG. 9 illustrates an exemplary computer system that facilitates in-document tagging in support of content dissemination in accordance with one embodiment of the present invention.

FIG. 9 illustrates an exemplary computer system that facilitates in-document tagging in support of content dissemination in accordance with one embodiment of the present invention. A computer system 902 includes a processor 904, a memory 906, and a storage device 908. Computer system 902 is coupled to a display 914, a keyboard 910, and a pointing device 912.

Storage device 908 stores in in-document tagging application 916, as well as applications 920 and 922. In-document tagging application 916 includes a content merging module 918, which allows a response from a recipient to be merged back. During operation, in-document tagging application 916 is loaded into memory 906, and processor 904 executes in-document tagging application 916 to allow a user to share contents by keyhole tagging.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating content dissemination, the method comprising:
   receiving, within a document editing system, a user input comprising one or more tags to insert inline within a document, wherein the document is formulated in a natural language and wherein a respective tag is at least partly formulated in natural language and is visible to the user, and indicates an action to be performed on a partial portion of the document and a receiving entity corresponding to the action;
   processing the one or more tags according to one or more rules to determine both the action to be performed on the partial portion of the document and the receiving entity; and
   disseminating the document portion indicated by the one or more tags to the corresponding receiving entity to facilitate performing the action specified in the one or more tags on the document portion.

2. The method of claim 1, wherein the tag also indicates the portion of the document.

3. The method of claim 2,
   wherein the action comprises one or more of:
      a showing of, sharing of, copying of, request of comment for, and a request of approval for the document portion with respect to the receiving entity;
   wherein the document portion includes one or more of: a paragraph, a section, and a specific text location; and
   wherein the receiving entity is identified by at least one of:
   one or more user identifiers,
   one or more group identifiers,
   one or more email addresses,
   one or more network addresses, and
   one or more pathnames.

4. The method of claim 1, wherein receiving the user input comprising one or more tags to insert inline within the document comprises:
   providing an owner with a visual representation of a collection of tags; and
   allowing the owner to select one or more tags from the collection of tags.

5. The method of claim 1,
   wherein the action includes sending the document portion to a user of the document; and
   wherein the method further comprises:
   receiving another document portion in response to the action performed; and
   modifying the document based on the other received document portion.

6. The method of claim 1, further comprising receiving a user command which triggers the processing of the tag.

7. The method of claim 1, wherein the processing of the one or more tags is performed at pre-determined times.

8. The method of claim 1, further comprising triggering the processing of the tag based on one or more events.

9. The method of claim 1, wherein disseminating the document portion comprises:
    encrypting a copy of the document portion; and
    sending the encrypted copy to the receiving entity.

10. The method of claim 1, wherein disseminating the document portion comprises:
    authenticating a copy of the document portion by signing the copy with a digital signature; and
    sending the authenticated copy to the receiving entity.

11. The method of claim 1, wherein at least a part of the tag contains an abstract specification which is used to identify at least one portion of the document.

12. A non-transitory computer-readable storage medium storing instructions that when executed by a computer cause the computer to perform a method for facilitating content dissemination, the method comprising:
    receiving, within a document editing system, a user input comprising one or more tags to insert inline within a document, wherein the document is formulated in a natural language and wherein a respective tag is at least partly formulated in natural language and is visible to the user, and indicates an action to be performed on a partial portion of the document and a receiving entity corresponding to the action;
    processing the one or more tags according to one or more rules to determine both the action to be performed on the partial portion of the document and the receiving entity; and
    disseminating the document portion indicated by the one or more tags to the corresponding receiving entity to facilitate performing the action specified in the one or more tags on the document portion.

13. The storage medium of claim 12, wherein the tag also indicates the portion of the document.

14. The storage medium of claim 13,
    wherein the action comprises one or more of:
        a showing of, sharing of, copying of, request of comment for, and a request of approval for the document portion with respect to the receiving entity;
    wherein the document portion includes one or more of: a paragraph, a section, and a specific text location; and
    wherein the receiving entity is identified by at least one of:
    one or more user identifiers,
    one or more group identifiers,
    one or more email addresses,
    one or more network addresses, and
    one or more pathnames.

15. The storage medium of claim 12, wherein receiving the user input comprising one or more tags to insert inline within the document comprises:
    providing an owner with a visual representation of a collection of tags; and
    allowing the owner to select one or more tags from the collection of tags.

16. The storage medium of claim 12,
    wherein the action includes sending the document portion to a user of the document; and
    wherein the method further comprises:
    receiving another document portion in response to the action performed; and
    modifying the document based on the other received document portion.

17. The storage medium of claim 12, further comprising receiving a user command which triggers the processing of the tag.

18. The storage medium of claim 12, wherein the processing of the one or more tags is performed at pre-determined times.

19. The storage medium of claim 12, further comprising triggering the processing of the tag based on one or more events.

20. The storage medium of claim 12, wherein disseminating the document portion comprises:
    encrypting a copy of the document portion; and
    sending the encrypted copy to the receiving entity.

21. The storage medium of claim 12, wherein disseminating the document portion comprises:
    authenticating a copy of the document portion by signing the copy with a digital signature; and
    sending the authenticated copy to the receiving entity.

22. The storage medium of claim 12, wherein at least a part of the tag contains an abstract specification which is used to identify at least one portion of the document.

23. A computer system that facilitates content dissemination, the computer system comprising:
    a processor;
    a memory;
    a tagging mechanism configured to receive, within a document editing system, a user input comprising one or more tags to insert inline within a document, wherein the document is formulated in a natural language and wherein a respective tag is at least partly formulated in natural language and is visible to the user, and indicates an action to be performed on a partial portion of the document and a receiving entity corresponding to the action;
    a tag processing mechanism to process the one or more tags according to one or more rules to determine both the action to be performed on the partial portion of the document and the receiving entity; and
    disseminate the document portion indicated by the one or more tags to the corresponding receiving entity to facilitate performing the action specified in the one or more tags on the document portion.

* * * * *